United States Patent [19]
Tsuchiya

[11] Patent Number: 5,859,727
[45] Date of Patent: Jan. 12, 1999

[54] OBJECTIVE UNIT

[75] Inventor: Atsuhiro Tsuchiya, Hachioji, Japan

[73] Assignee: Olympus Optical Co., Ltd., Tokyo, Japan

[21] Appl. No.: 900,958

[22] Filed: Jul. 25, 1997

[30]     Foreign Application Priority Data

Jul. 29, 1996  [JP]  Japan ................................. 8-199184
Jul. 22, 1997  [JP]  Japan ................................. 9-195951

[51] Int. Cl.⁶ ......................... G02B 21/06; G02B 21/02
[52] U.S. Cl. ..................... 359/387; 359/385; 359/661
[58] Field of Search ................................. 359/368–374, 359/385–390, 642, 656, 808–811, 819

[56]          References Cited

U.S. PATENT DOCUMENTS

| | | | |
|---|---|---|---|
| 1,954,775 | 4/1934 | Heine | 359/387 |
| 2,809,554 | 10/1957 | Bernhardt | 359/661 |
| 2,844,992 | 7/1958 | Bernhardt | 359/661 |
| 4,160,578 | 7/1979 | Gottlieb et al. | 359/387 |
| 4,634,234 | 1/1987 | Baumann | 359/661 |

FOREIGN PATENT DOCUMENTS

| | | | |
|---|---|---|---|
| 488899 | 1/1930 | Germany | 359/387 |
| 492843 | 11/1975 | U.S.S.R. | 359/387 |

*Primary Examiner*—Thong Nguyen
*Attorney, Agent, or Firm*—Frishauf, Holtz, Goodman, Langer & Chick

[57]          ABSTRACT

An objective unit in which illumination light is applied through an annular illumination light path surrounding lenses for guiding observation light coming from an object of observation, and which includes a shared lens for guiding the illumination light from the illumination light path to the object of observation and for guiding the observation light to the lenses.

12 Claims, 6 Drawing Sheets

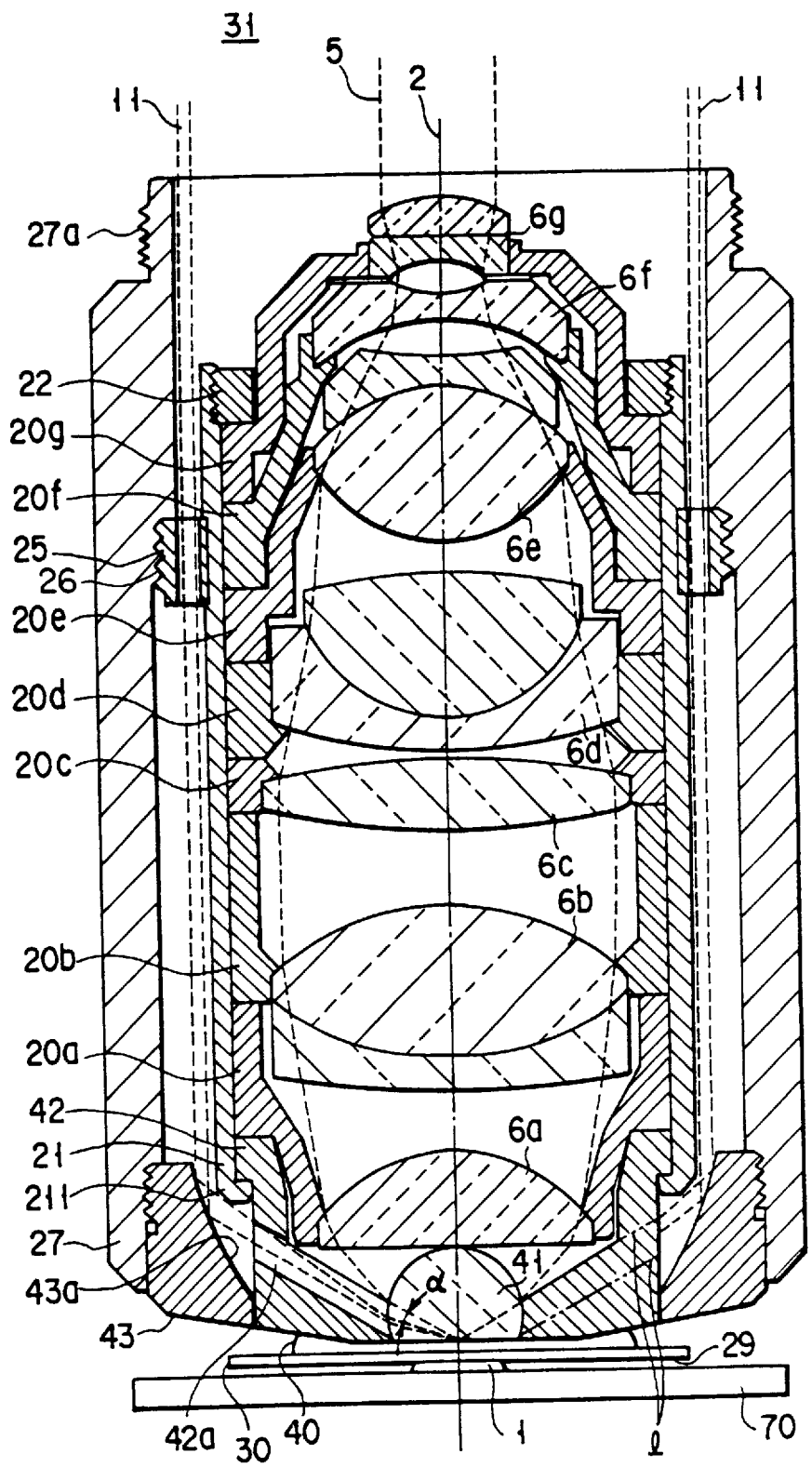
F I G. 1

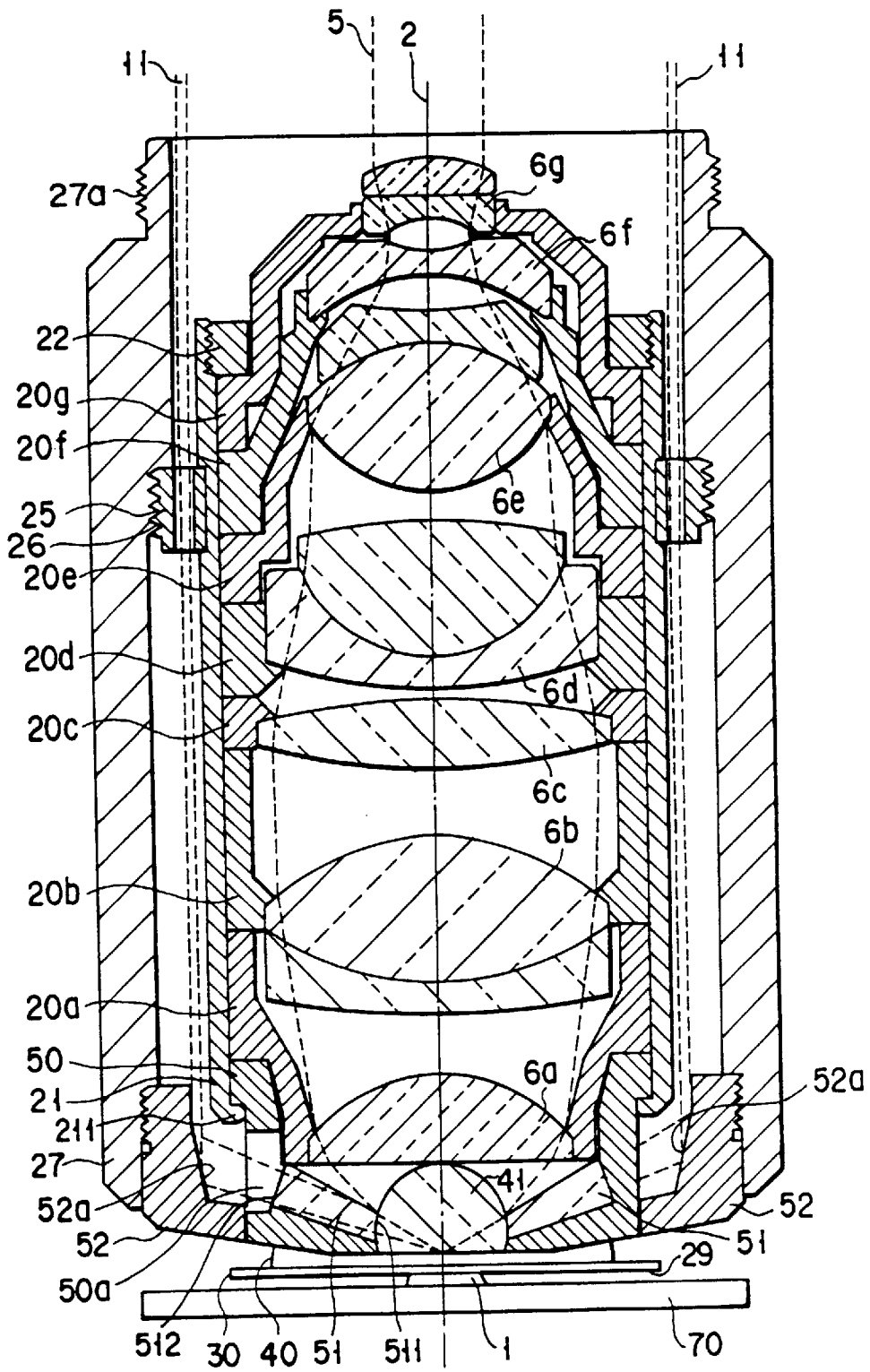
F I G. 2

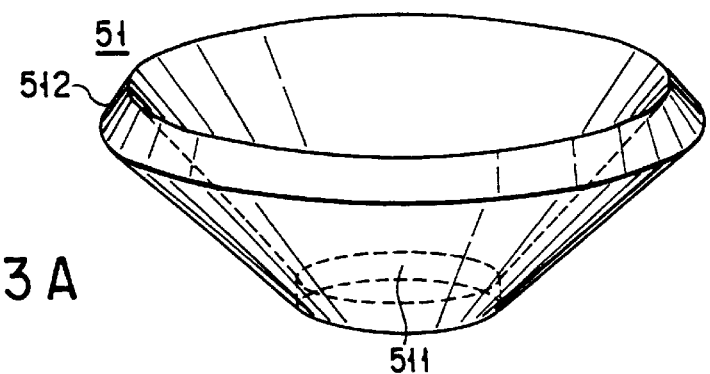
FIG. 3A
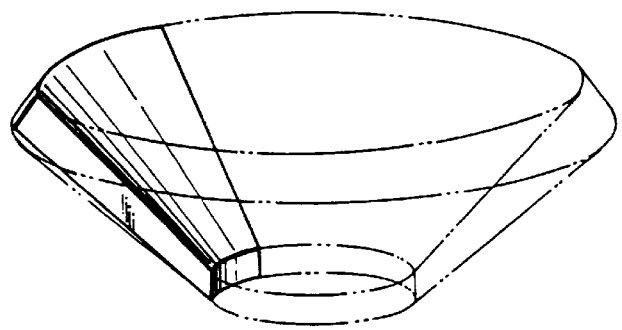
FIG. 3B
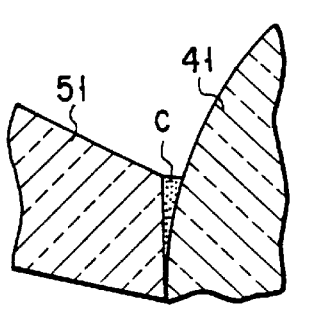  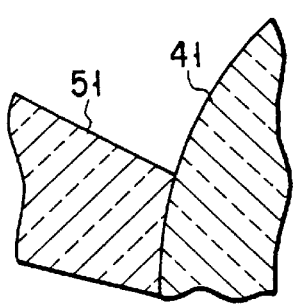  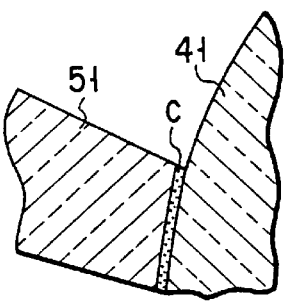
FIG. 4A    FIG. 4B    FIG. 4C
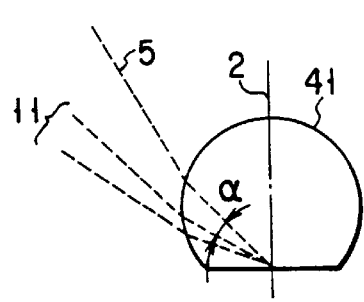    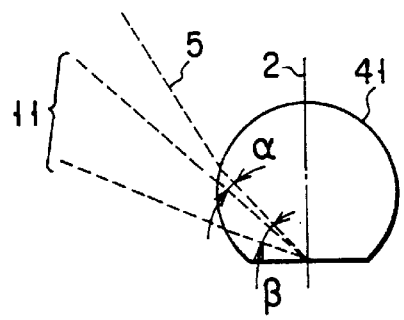
FIG. 5A    FIG. 5B

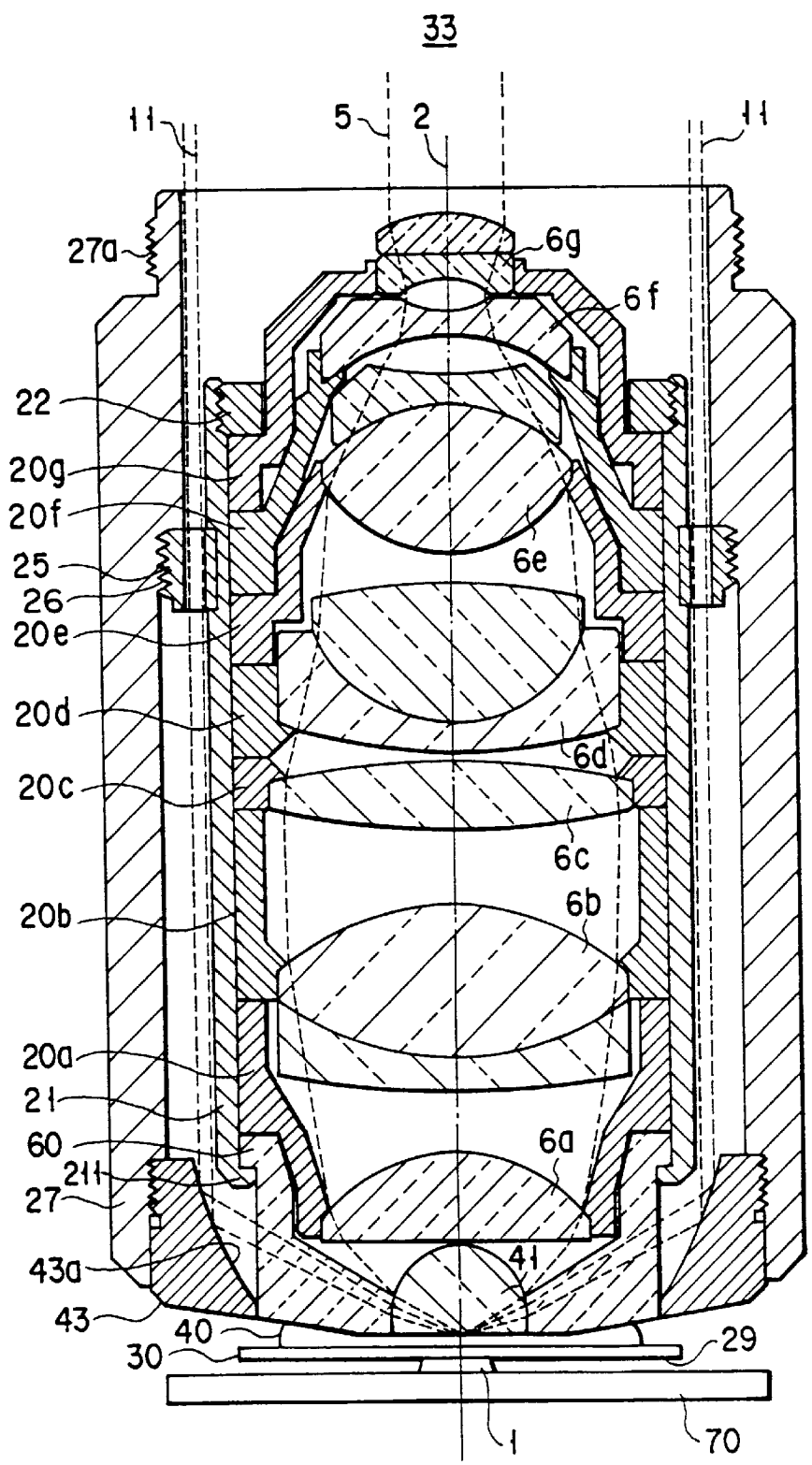
F I G. 6

OBJECTIVE UNIT

BACKGROUND OF THE INVENTION

The present invention relates to an objective unit which is for use in an optical microscope and which performs incident lighting, and more particularly to an objective unit which uses a space outside the observation light path to perform lighting for accomplishing dark-field observation or for generating evanescent waves to achieve incident-light fluorescent observation.

FIG. 7 is a sectional view of the illumination system of an optical microscope. The microscope comprises an objective unit 3, a focusing lens 4, and eye lens (not shown), a lamp 7, a collector lens 9, and mirror 10. To obtain a magnified image of a sample 1 (i.e., an object of observation), the objective unit 3, focusing lens 4 and eye lens are arranged in the axis 2 of observation light. The objective unit 3 contains an objective lens system 6.

The lamp 7 is located at a predetermined distance from the observation-light axis 2. The lamp 7 emits light for incident lighting, which has an illumination-light axis 8 extending at right angles to the observation-light axis 2. Arranged in the illumination-light axis 8 are the collector lens 9 and the mirror 10. The collector lens 9 is semi-spherical, while the mirror 10 is shaped like a ring. The mirror 10 is inclined at 45° to the observation-light axis 2 and the illumination-light axis 8. The mirror 10 has an annular reflecting surface.

The collector lens 9 collects the light emitted from the lamp 7 for incident lighting, converting the light to a light beam having a circular cross section. The light beam reaches the mirror 10. Part of the light beam passes through the opening of the mirror 10. The remaining part of the light beam is reflected downwards from the reflecting surface of the mirror 10. It is used as an illumination light (incident illumination light) 11 which is suitable for incident lighting. The light beam has an annular cross section and is coaxial with the observation-light axis 2. The illumination light 11 passes surrounding the observation light path and is guided into objective unit 3.

The illumination light 11 for incident lighting passes through the objective unit 3, surrounding the lens system 6. The illumination light 11 is then reflected by a mirror 12 and converged onto the sample 1. The observation light beam 5 reflected from the sample 1 passes through the lens system 6 of the unit 3. The light beam 5 then passes through the focusing lens 4. Eventually the light beam 5 is guided to the eye lens (not shown), whereby an observer can see a magnified image of the sample 1.

The objective unit 3 will be described in detail, with reference to FIG. 8 which is a sectional view. The objective unit 3 is a dry objective unit. As seen from FIG. 8, the unit 3 comprises lens-holding frames 20a to 20g, a hollow cylinder 21, and a lens-holding ring 22, besides the lens system 6. The lens system 6 consists of seven lenses 6a to 6g which are arranged in the observation-light axis 2. The lenses 6a to 6g are held by the lens-holding frames 20a to 20g, respectively. The frames 20a to 20g are provided in the hollow cylinder frame 21 and held in place once the lens-holding ring 22 has been fitted into one end of the hollow cylinder frame 21.

As shown in FIG. 8, a ring 25 is mounted on the objective unit 3. The ring 25 will be described with reference to FIG. 9, which is a part of a sectional view taken along line IX—IX in FIG. 8. As FIG. 9 shows, the ring 25 has two arcuate elongated holes 23 and 24. Thus, the ring has two parts in which no holes are made. The holes 23 and 24 are arranged in the same circle and separated from each other. The ring 25 has a screw thread 26 on its outer circumferential surface.

As seen from FIG. 8, a hollow cylindrical cover 27 is mounted on the mirror 12 and also on the ring 25. The cover 27 is set in screw engagement with the ring 25 at the screw 26 thereof, positioned coaxial with the hollow cylinder 21. Hence, an annular space is provided between the hollow cylinder 21 and the hollow cylindrical cover 27 by holes 23 and 24. The annular space serves as illumination light path. The mirror 12, which is fitted in the distal end of the cover 27, reflects the illumination light 11 at its reflecting surface 12a, applying the light 11 onto the sample 1.

As illustrated in FIG. 8, a cover glass 30 is located below the objective unit 3. The cover glass 30 has a sample-mounting surface 29. The hollow cylindrical cover 27 has a screw 27a on its proximal end. At the screw 27a the objective unit 3 is removably attached to the body of the microscope.

In the illumination system shown in FIG. 7, the lamp 7 is the illumination light source, and the illumination light 11 is applied into the objective unit 3 by using the collector lens 9 and the mirror 10.

The illumination light 11 is applied to the sample 1, with a numerical aperture (NA) larger than that of the observation light. The 0th-order light totally reflected from the sample 1 does not enter the observation light path provided in the objective unit 3. The high-order light diffracted and scattered from the sample 1 enters the lens 6a set in the observation light path and passes through the lens 6b to 6g set also in the observation light path. The high-order light is applied to the focusing lens 4, which focuses the light. The light thus focused is guided to the eye lens (not shown) or a video camera (not shown), etc. Dark-field observation of the sample 1 is thereby accomplished.

The objective lens 3 may be an oil immersion objective. In this case, assume that the cover glass 30, the oil and the sample 1 have refractive indices of 1.5, 1.5 and 1.3, respectively. Then, the illumination light applied with NA of 1.3 or more is totally reflected at the interface between the cover glass 30 and the sample 1. In this case, evanescent light is generated on the side of the sample 1. The evanescent light may be used as excitation light in the oil immersion objective unit. Fluorescent observation can then be achieved by use of the illumination path independent of the observation system even if the objective unit comprises lenses having great NAs. This is utilized when objective lenses designed for mono-molecular fluorescent observation are employed in order to reduce auto-fluorescent light and attain a high S/N ratio.

Being a dry system, not a liquid-immersion system, the objective unit 3 shown in FIG. 8 has a small NA and a long working distance (WD), i.e., the distance between its distal end and the cover glass 30. Therefore, the unit 3 has a sufficient space for the illumination light path. On the other hand, most liquid immersion objective units, particularly oil immersion ones, comprises lenses having a large NA of about 1 to about 1.45 and have a short working distance of about 0.1 mm. In such a liquid immersion objective unit, the distal end, the lens-holding frames and the hollow cylinder make it difficult to provide a space large enough for an illumination light path.

To enable the objective unit 3 to apply as much illumination light as possible to the sample, it is necessary to increase the NA of the illumination light 11. If the light 11 has an NA as large as that of the observation light beam, i.e.

it has a large marginal ratio, the peripheral part of the light 11 will be blocked by the lens-holding frames. Hence, the illumination light 11 cannot have a large NA.

To increase the NA of the illumination light 11, the wall thickness of the lens-holding frames 20a to 20g may be decreased, making it possible to broaden the annular space for passing the illumination light 11. If the frames 20a to 20g have less wall thickness, however, they will become less rigid than is required to hold the lenses 6a to 6g in a completely coaxial relationship. And, it is difficult to ensure a high degree of precision with respect to the dimensions of the frames. In addition, the size of the objective unit 3 is limited; its overall length should be 45 mm or less. The lenses cannot be made thicker and the lens-holding frames cannot be made longer, in order to increase the working distance so as to provide a space sufficient for an illumination light path.

BRIEF SUMMARY OF THE INVENTION

The object of the present invention is to provide an objective unit which has a large numerical aperture (NA) and a short working distance (WD) as an oil immersion objective unit, and which has an illumination light path outside the observation light path which guides an illumination light such that the light is not blocked by lenses or lens-holding frames.

According to the invention, there is provided an objective unit in which illumination light is applied through an annular illumination light path surrounding lenses for guiding observation light coming from an object of observation, the unit comprising: a shared lens for guiding the illumination light from the illumination light path to the object of observation and for guiding the observation light to the lenses.

Additional objects and advantages of the invention will be set forth in the description which follows, and in part will be obvious from the description, or may be learned by practice of the invention.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a longitudinal sectional view of an objective unit according to a first embodiment of the invention, taken along a plane containing the axis of the observation light;

FIG. 2 is a longitudinal sectional view of an objective unit according to a second embodiment of the invention, taken along a plane containing the observation light axis;

FIG. 3A is a perspective view of the prism incorporated in the second embodiment of the invention;

FIG. 3B is a perspective view of one of prism pieces which may be used in the second embodiment;

FIG. 4A is a diagram explaining a method of coupling a shared lens to the prism shown in FIG. 3A;

FIG. 4B is a diagram explaining an another of coupling a shared lens to the prism shown in FIG. 3A;

FIG. 4C is a diagram explaining still another method of coupling a shared lens to the prism shown in FIG. 3A;

FIG. 5A is a diagram representing an angle defined between the illumination light and an observation light;

FIG. 5B is a diagram representing a different angle defined between the illumination light and an observation light;

FIG. 6 is a longitudinal sectional view of an objective unit according to a third embodiment of the invention, taken along a plane containing the axis of the observation light;

DETAILED DESCRIPTION OF THE INVENTION

Embodiments of the present invention will be described, with reference to the accompanying drawing.

Figure 7:
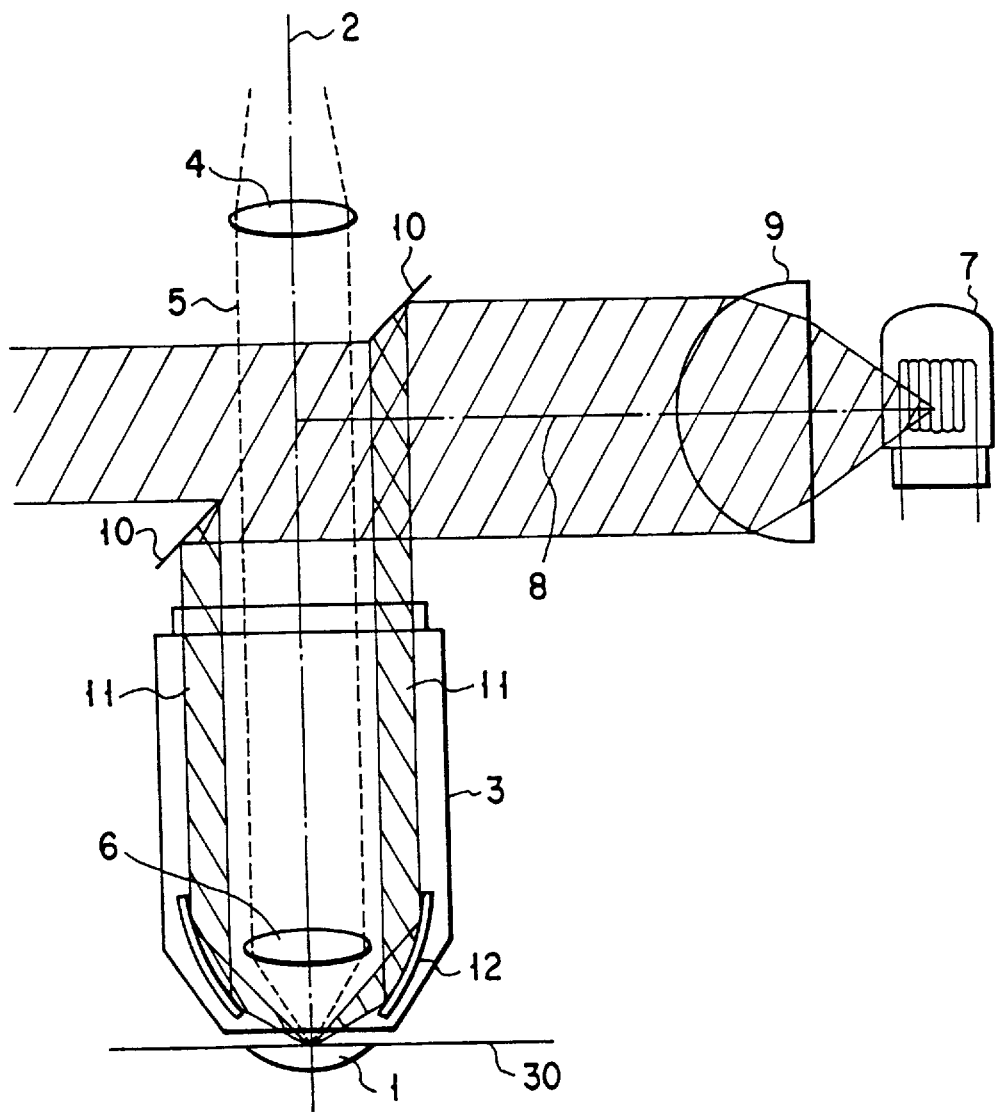
FIG. 7 is a sectional view of the illumination system of an optical microscope.
Figure 8:
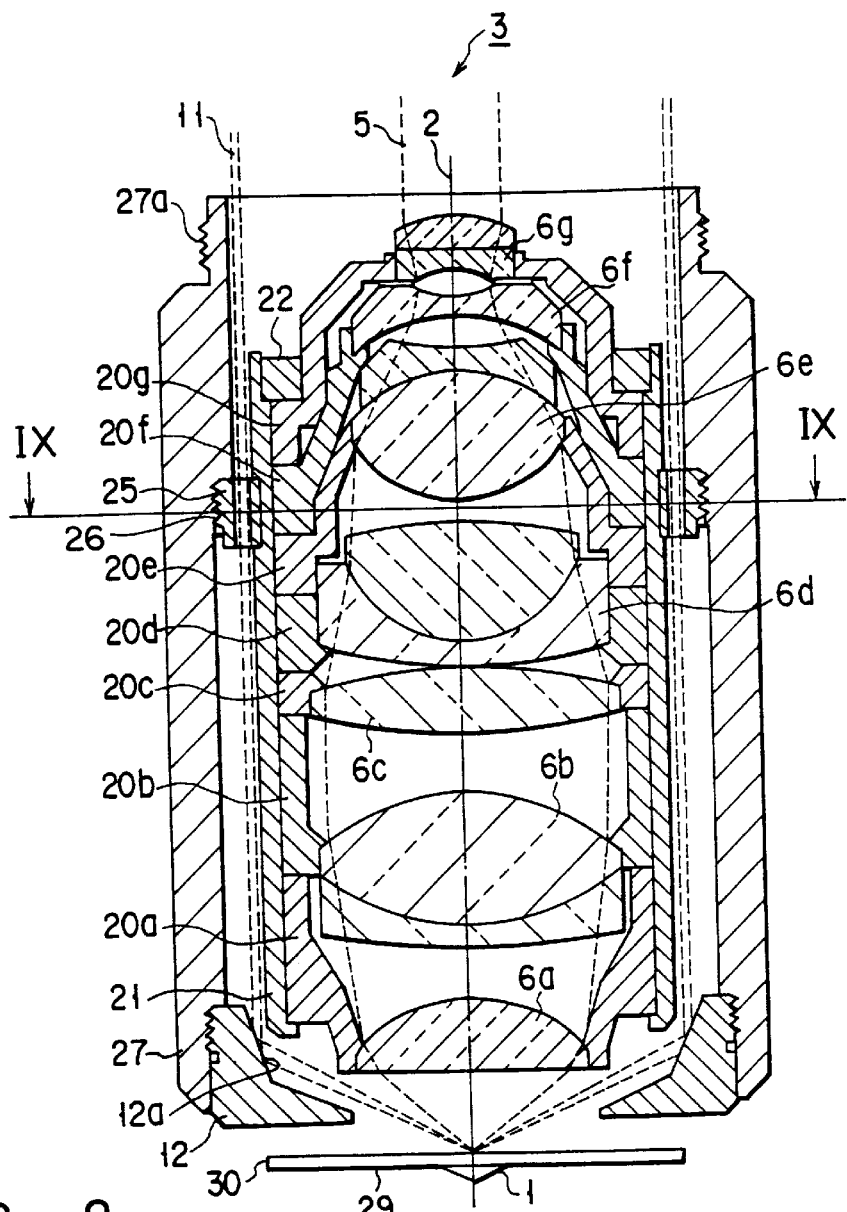
FIG. 8 which is a sectional view of the dry system objective unit incorporated in the conventional microscope.
Figure 9:
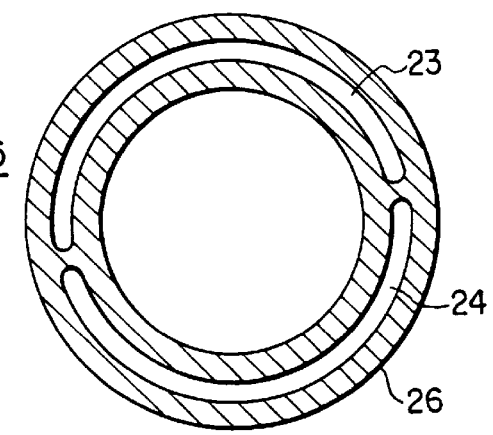
FIG. 9 is a sectional view of the ring mounted on the objective unit shown in FIG. 8, taken along line IX—IX in FIG. 8.

FIG. 1 is a longitudinal sectional view of the objective unit 31, or the first embodiment of the invention, taken along a plane containing the axis of the observation light. The objective unit 31 is located on the position on which there is located on the objective unit 3 incorporated in the illumination system of the conventional optical microscope, which is shown in FIG. 7. In FIG. 1, the same components as those of the conventional objective unit shown in FIG. 8 are designated at the same reference numerals.

The objective unit 31 is an oil immersion type wherein oil 40 is filled in the space between a cover glass 30 and the distal end of the unit 31. The unit 31 has a working distance (WD) of about 0.1 mm. A sample 1 is placed on an object glass 70. The sample 1 is covered with a cover glass 30.

Fitted in the distal end of the objective unit 31 are a shared lens 41 and a lens-holding frame 42. The frame 42 is a hollow cylinder closed at the lower end, in which a circular hole is made. The frame 42 has a path hole 42a for guiding an illumination light 11. The path hole 42a is a through hole that extends between the outer and inner circumferential surfaces of the frame 42 and opens in both circumferential surfaces thereof. In other words, the frame 42 has a through hole between the outer and inner circumferential surfaces. The path hole 42a opens, but not all around the lens-holding frame 42. In other words, the frame 42 has one part in which the path hole 42a is not formed at all.

The lens-holding frame 42 may have two or more paths, instead of one. In other words, the frame has some through holes between the outer and inner circumferential surfaces. In this case, the paths are spaced apart in the circumferential direction of the frame 42.

It suffices for the path hole 42a to extend from the outer surface of the frame 42 to the inner surface thereof. It may be made in the lower part of the frame 42, in the form of either a groove or a hole.

The shared lens 41 is fitted in the circular hole made in the lower end of the lens-holding frame 42. The frame 42 is snap-fitted in the lower end of a hollow cylinder 21, by virtue of an annular projection 211 of the hollow cylinder 21. Provided in the hollow cylinder 21 are lenses 6a to 6g and lens-holding frames 20a to 20g. The lenses 6a to 6g are held in the frames 20a to 20b, respectively. The frames 20a to 20g are fitted in the cylinder 21 and held in place once a lens-holding ring 22 has been fitted into one end of the hollow cylinder 21.

A hollow cylindrical mirror 43 is fitted into one end of the hollow cylindrical cover 27. The mirror 43 has a conical inner surface, i.e, an inclined reflecting surface 43a. The reflecting surface 43a reflects the illumination light 11 having an annular cross section, applying the light 11 onto the sample 1 through the path hole 42a provided in the lens-holding frame 42.

The shared lens 41 and the frame 42 will be described in detail. As mentioned above, the objective unit 31 is an oil immersion type and therefore has a large NA. The shared lens 41 is a sphere with a part cut off, having a cross section larger than half the sphere. The lens 41 therefore has a flat circular face whose diameter is shorter than the diameter of the sphere. The circular hole made in the lower end of the lens-holding frame 42 has the same diameter as that of the flat circular face of the shared lens 41. The lens 41 is fitted in the circular hole of the frame 42. As indicated above, the frame 42 has a path hole 42a. The path hole 42a extends between the outer circumferential surface of the frame 42 and the inner circumferential surface thereof (i.e., the lens-holding surface).

How the objective unit 31 works will be explained, with reference to FIG. 7. As shown in FIG. 7, the light emitted from the lamp 7 is focused by the collector lens 9, forming a light beam which has a circular cross section. Part of the light beam passes through the opening of the mirror 10. The remaining part of the light beam is reflected downwards from the reflecting surface of the mirror 10. It is used as an illumination light 11 which is suitable for incident lighting. The light has an annular cross section and is coaxial with the observation-light axis 2. The illumination light 11 is guided through an annular space located outside the observation light path and is applied into the objective unit 31.

In the objective unit 31, the illumination light 11 passes through the illumination light path which has an annular cross section. This light path is provided between the cylinder 21 and the hollow cylindrical cover 27 and, hence, surrounds the lens system 6 or the lenses 6a to 6g. The illumination light 11 reaches the hollow cylindrical mirror 43. The inclined surface 43a of the mirror 43 reflects the illumination light 11, applying the light 11 to the path hole 42a made in the lens-holding frame 42. The light 11 is applied through the path hole 42a to the shared lens 41. The lens 41 refracts the light 11. The light 11 thus refracted passes through the oil 40 and the cover glass 30. The light 11 is therefore applied to the sample 1 mounted on the object glass 70.

The light reflected from the sample 1, or the observation light 5, passes through the cover glass 30, the oil 40, the shared lens 41, the lenses 6a to 6g and the focusing lens 4. The observation lights reaches the eye lens (not shown), etc, which provides a magnified image of the sample 1.

As indicated by the two dash-dotted lines 1 in FIG. 1, the frame 42 may have a through hole in the part in which the path hole 42a is not formed. The hole can guide a part of the light 11 into the illumination light path, said part of the light 11 having been diffracted at the outer surface of the shared lens 41 and then totally reflected from the interface between the sample 1 and cover glass 30.

Since the objective unit 31 is an oil immersion type, it has a large NA and a short working distance, so that it is difficult for the unit 31 to include in its distal end portion a space for guiding the illumination light 11. Nonetheless, the lens-holding frame 42 does not block the illumination light 11 because it has the light-guiding path hole 42a. The light 11 passes through the path hole 42a provided outside the observation light path and reaches, in its entirety, to the sample 1 through the shared lens 41, oil 40 and cover glass 30.

Furthermore, the shared lens 41 serves not only to apply the illumination light 11 onto the sample 1 but also to guide the observation light toward the focusing lens 4. An incident-lighting only lens for guiding the observation need not be used, and a space for accommodating such a lens need not be provided in the objective unit 31. The unit 31 can be manufactured at lower cost than otherwise. Still further, the shared lens 41 can easily apply the illumination light 11 onto the sample 1 because the lens 41 is designed to guide the light reflected from the sample 1, along the axis 2 of observation light.

As described above, the path hole 42a opens, but not all around the lens-holding frame 42. Hence, the frame 42 has an inner circumferential surface large enough to hold the shared lens 41 firmly. The path hole 42a almost does not reduce that surface of the frame 42 which contacts the shared lens 41. Since the frame 42 has one part in which the path hole 42a is not formed at all, it is rigid enough to maintain its shape even while being machined. In addition, the frame 42 can have dimensions of high precision.

As indicated by the two dash-dotted lines 1, the frame 42 has a through hole. The hole guide a part of the light 11 into the illumination light path, said part of the light 11 having been totally reflected from the interface between the sample 1 and cover glass 30. Thus guided through the hole, the part of the light 11 would not be scattered at the frame 42. It would not enter the observation light path, as noise known as "flare.", etc. Hence, the microscope can provide a high-contrast, high SN ratio image of the sample 1.

An objective unit 32 according to the second embodiment of the invention will be described, with reference to FIG. 2. FIG. 2 is a longitudinal sectional view of the objective unit 32 taken along a plane containing the axis of the observation light. The objective unit 32 is located on the position on which there is located on the objective unit 3 incorporated in the illumination system of the conventional optical microscope, which is shown in FIG. 7. In FIG. 2, the same components as those of the conventional lens unit shown in FIG. 8 are designated at the same reference numerals. The objective unit 32 is an oil immersion type wherein oil 40 is filled in the space between a cover glass 30 and the distal end of the unit 32. The unit 32 has a working distance (WD) of about 0.1 mm.

Fitted in the distal end of the objective unit 32 are a shared lens 41 and a lens-holding frame 50. The frame 50 is a hollow cylinder closed at the lower end, in which a circular hole is made. The frame 50 has a path hole 50a for guiding an illumination light. The path hole 50a is a through hole that extends between the outer and inner circumferential surfaces of the frame 50 and opens in both circumferential surfaces thereof. In other words, the frame 50 has a through hole between the outer and inner circumferential surfaces. The path hole 50a opens, but not all around the lens-holding frame 50. Namely, the frame 50 has one part in which the path hole 50a is not formed at all. Inserted in the path hole 50a is a prism 51, which will be described later in detail. The lens-holding frame 50 may have two or more through holes, instead of one. In this case, the through holes are spaced apart in the circumferential direction of the frame 50.

It suffices for the path 50a to extend from the outer surface of the frame 50 to the inner surface thereof. It may be made in the lower part of the frame 50, in the form of either a groove or a hole.

The shared lens 41 is fitted in the circular hole made in the lower end of the lens-holding frame 50. The frame 50 is snap-fitted in the lower end of a hollow cylinder 21, by virtue of an annular projection 211 of the hollow cylinder 21. Provided in the hollow cylinder 21 are lenses 6a to 6g and lens-holding frames 20a to 20g. The lenses 6a to 6g are held in the frames 20a to 20b, respectively. The frames 20a to 20g are fitted in the cylinder 21 and held in place once a lens-holding ring 22 has been fitted into one end of the hollow cylinder 21.

A hollow cylindrical mirror 52 is fitted into one end of the hollow cylindrical cover 27. The mirror 52 has a closed lower end, in which circular opening is made. It has a conical inner surface, i.e, an inclined reflecting surface 52a. The reflecting surface 52a reflects the illumination light 11 having an annular cross section, applying the light 11 onto a sample 1 through the path hole 50a provided in the lens-holding frame 50.

The share lens 41, the frame 50 and the prism 51 will be described in detail.

FIG. 3A is a perspective view of the prism 51. As FIG. 3A shows, the prism 51 is a truncated cone having a circular through hole in its center part. It has a cylindrical inner surface 511 in its lower end and a conical outer surface 512 at its top. The prism 51 is made of material which exhibits a refractive index higher than that of the shared lens 41. The shared lens 41 has its lower part fitted in the cylindrical inner surface 511 of the prism 51 and the inner surface of the frame 50. The inner surface of the frame 50 is flush with the cylindrical inner surface 511 of the prism 51. As indicated above, the path hole 50a extends between the outer and inner circumferential surfaces of the lens-holding frame 50. The inner circumferential surface holds the shared lens 41.

FIG. 3B shows one of prism pieces obtained by dividing the prism 51 shown in FIG. 3A into eight. The prism 51 is not limited to a 8-piece type but may consist of an arbitrary number of pieces. One or more of the pieces of the prism 51 can be buried in the through hole or holes 50a formed at the predetermined locations of the lens holding frame 50. The number of through holes 51a is determined in accordance with the number of prism pieces used, and the size of each through hole 50 is determined in such a manner that one prism piece can be fitted therein.

The shared lens 41 and the prism 51 can be coupled in various methods, as will be explained with reference to FIGS. 4A, 4B and 4C.

As shown in FIG. 4A, the lower part of the lens 41 is placed in the cylindrical inner surface 511 of the prism 51 and adhered thereto with adhesive c which has the same refractive index as the prism 51.

Alternatively, as shown in FIG. 4B, the lower part of the lens 41 may set in optical contact with the inner surface 511 which is curved in the same way as the surface of the shared lens 41.

Further, as illustrated in FIG. 4C, the lower part of the lens 41 may placed in the cylindrical inner surface 511 which is curved in the same way as the surface of the lens 41. And the gap between the lens 41 and the surface 511 of the prism 51 may be filled with adhesive c which has the same refractive index as the prism 51.

How the objective unit 32 works will be explained, with reference to FIG. 7. As shown seen from FIG. 7, the light emitted from the lamp 7 is focused by the collector lens 9, forming a light beam which has a circular cross section. Part of the light beam passes through the opening of the mirror 10. The remaining part of the light beam is reflected downwards from the reflecting surface of the mirror 10 and is used as an illumination light 11. The illumination light 11 has an annular cross section and is coaxial with the observation-light axis 2. The light 11 is guided through an annular space located outside the observation path and is applied into the objective unit 32.

In the objective unit 32, the illumination light 11 passes through the illumination light path which has an annular cross section. This light path is provided between the cylinder 21 and the hollow cylindrical cover 27 and, hence, surrounds the lenses 6a to 6g. The illumination light 11 reaches the hollow cylindrical mirror 52. The inclined surface 52a of the mirror 52 reflects the illumination light 11, applying the light 11 to the path hole 50a made in the lens-holding frame 50. The light 11 is applied through the path hole 50a to the shared lens 41.

Since the prism 51 has a higher refractive index than the shared lens 41, the illumination light 11 is refracted at the interface between the lens 41 and the prism 51, away from the observation-light axis 2. The light 11 is then refracted by the shared lens 41. Thus refracted, the light 11 passes through the oil 40 and the cover glass 30 and is applied to the sample 1 mounted on the object glass 70.

The light reflected from the sample 1, or the observation light 5, passes through the cover glass 30, the oil 40, the shared lens 41, the lenses 6a to 6g and the focusing lens 4. The observation light 5 reaches the eye lens (not shown), etc, which provides a magnified image of the sample 1.

The second embodiment attain the same advantage as the first embodiment. Moreover, it is advantageous in that the illumination light 11 is refracted at a greater angle to the observation-light axis 2 as will be described below, even if the light 11 has the same NA as the light 11 used in the first embodiment. This is because the prism 51 is held in the lens-holding frame 50 has a higher refractive index than the shared lens 41.

In the first embodiment, the angle α between the light 11 and the observation light 5 can be reduced but to a certain degree as shown in FIG. 5A, due to the positions of the hollow cylinder 21 and lens-holding frame 42. In the second embodiment, the angle α can be reduced as much as is illustrated in FIG. 5B. The angle α can be reduced so that the diameter of the illumination light beam 11 has a large value, and so that the path for the light 11 is located farther from the hollow cylinder 21 and the lenses 6a to 6g than in the first embodiment. A larger space is therefore available in the distal end of the second embodiment. Since the illumination light 11 has a larger cross section than the light 11 applied to the sample 1 in the first embodiment, the sample 1 can be illuminated more than in the case the first embodiment is used.

As shown in FIG. 4A, the shared lens 41 and the prism 51 are connected by adhesive. The adhesive has the same refractive index as the prism 51. Therefore, the prism 51 can apply the light 11 to the lens 41 at a desired incident angle, even if it has not been processed with high precision at the surface contacting the lens 41. Optically connected together, the shared lens 41 and the prism 51 prevent the light scattered by the adhesive, from entering the observation light path. This enables the microscope to provide a high SN-ratio (i.e., observation light/scattered light) image of the sample 1.

The illumination light 11 is scarcely refracted at the conical outer surface 512 of the prism 51, to which the light 11 is applied. The prism 51 may be re-designed to incline the surface 512 to increase the incidence angle of the beam 11. The surface 512 may be a part of the surface of a sphere. Further, the prism 51 may have the same refractive index as the shared lens 41 or may be made of the same glass as the lens 41, in order to decrease the aberration resulting from the refraction of the light 11 at the interface between the lens 41 and the prism 51.

An objective unit 33 which is the third embodiment of the invention will be describe, with reference to FIG. 6. FIG. 6 is a longitudinal sectional view of the objective unit 33, taken along a plane containing the axis of the observation light. The objective unit 33 is located on the position on which there is located on the objective unit 3 incorporated in the illumination system of the conventional optical microscope, which is shown in FIG. 7. In FIG. 6, the same components as those of the conventional lens unit shown in FIG. 8 are designated at the same reference numerals. The objective unit 33 is an oil immersion one. Oil 40 is filled in the space between a cover glass 30 and the distal end of the unit 33. The unit 33 has a working distance (WD) of about 0.1 mm.

Fitted in the distal end of the objective unit 33 are a shared lens 41 and a lens-holding frame 60. The frame 60 is a hollow cylinder closed at the lower end, in which a circular hole is made. The frame 60 is made of material which is greatly transparent to light. The frame 60 therefore acts as a prism.

The shared lens 41 is a sphere with a part cut off, having a cross section larger than half the sphere and a flat circular face whose diameter is shorter than the diameter of the sphere. The lower part of the lens 41 is fitted in the circular hole made in the lower end of the lens-holding frame 60. The frame 60 is snap-fitted in the lower end of a hollow cylinder 21, by virtue of an annular projection 211 of the hollow cylinder 21. Provided in the hollow cylinder 21 are lenses 6a to 6g and lens-holding frames 20a to 20g. The lenses 6a to 6g are held in the frames 20a to 20b, respectively. The frames 20a to 20g are fitted in the cylinder 21 and held in place once a lens-holding ring 22 has been fitted into one end of the hollow cylinder 21.

A hollow cylindrical mirror 43 is fitted into one end of the hollow cylindrical cover 27. The mirror 43 has a conical inner surface, i.e, an inclined reflecting surface 43a. The reflecting surface 43a reflects the illumination light 11 having an annular cross section, applying the light 11 onto the sample 1 through the the lens-holding frame 60.

How the objective unit 33 works will be explained, with reference to FIG. 7. As shown seen from FIG. 7, the light emitted from the lamp 7 is focused by the collector lens 9, forming a light beam which has a circular cross section. Part of the light beam passes through the opening of the mirror 10. The remaining part of the light beam is reflected downwards from the reflecting surface of the mirror 10 and is used as an illumination light 11. The illumination light 11 has an annular cross section and is coaxial with the observation-light axis 2. The light 11 is guided through an annular space located outside the observation path and is applied into the objective unit 33.

In the objective unit 33, the illumination light 11 passes through the illumination light path which has an annular cross section. This light path is provided between the cylinder 21 and the hollow cylindrical cover 27 and, hence, surrounds the lenses 6a to 6g. The illumination light 11 reaches the hollow cylindrical mirror 43. The inclined surface 43a of the mirror 43 reflects the illumination light 11, applying the light 11 to the lens-holding frame 60. The light 11 passes through the frame 60 which acts as a prism, reaching the shared lens 41.

The lens 41 refracts the light 11. The light 11 thus refracted passes through the oil 40 and the cover glass 30.

The light 11 is therefore applied to the sample 1 mounted on the object glass 70.

The light reflected from the sample 1, or the observation light 5, passes through the cover glass 30, the oil 40, the shared lens 41, the lenses 6a to 6g and the focusing lens 4. The observation light reaches the eye lens (not shown), etc, which provides a magnified image of the sample 1.

The third embodiment attain the same advantage as the first embodiment. Further, the lens-holding frame 60 does not block the illumination light 11 at all because it is made of material transparent to light. The light 11 is therefore applied, in its entirety, onto the sample 1. Moreover, since frame 60 need not have path hole to guide the illumination light 11, the frame 60 is rigid enough to hold the lens 41 firmly. In addition, since the frame 60 is transparent, the light 11 is applied to the sample 1 at an angle $\beta$ with respect to the observation light 5, as shown in FIG. 5B. The illumination light beam 11 is thus far from the axis 2 of observation light, and this helps to illuminate the sample 1 more brightly.

The lens-holding frame 60 may be replaced by a plurality of segments which forms a hollow cylinder when combined together.

The present invention is not limited to the embodiments described above. Various changes and modifications can be made. For example, the illumination light 11 may be guided by the lens 6a and the frame 20a holding the lens 6a, not by the shared lens 41 and the frame holding the lens 41 as in the first to third embodiments.

Further, the shared lens 41 may be used to guide only the observation light, not both the observation light and the illumination light 11 as in the first to third embodiments. In this case, the illumination light 11 is replaced by dark-field illumination light such as evanescent illumination light. Still further, the present invention is not limited to oil immersion (liquid immersion system) objective units only. It can also be applied to dry system objective units. Specifically, the first to third embodiments can be converted to dry system type objective units merely by draining the oil 40. Moreover, the components of the first to third embodiments may be used in various combinations, providing various modified objective units.

Furthermore, the embodiments described above can be modified so long as an illumination light is guided parallel to the observation-light axis 2 through the annular space provided between the hollow cylinder 21 and the hollow cylindrical cover 27. For example, an annular optical fiber may be located above the annular space, and a laser beam may be applied directly from the optical fiber into the space from above.

As has been described, the objective unit according to the invention is simple in structure and makes good use of an internal space, thanks to the shared lens which guides both the illumination light and the observation light. No lens for applying the illumination light only need not be used, and the illumination light can easily focused on the object of observation. Further, the frame holding the shared lens does not block the illumination light at all; rather it guides the illumination light to the object of observation. Since the frame holding the shared lens has a greater refractive index than the shared lens, it can refracts the illumination light at a large angle to the axis of the observation light. Hence, the illumination light path can be located remote from the other lenses used in the unit and from the frames holding these lenses, whereby a larger space is available in the distal end of the objective unit. A thick beam of illumination light can therefore be applied, achieving effective incident lighting to illuminate the object brightly.

Thus, the present invention achieves an objective unit which has a large numerical aperture (NA) and a short working distance (WD) as an oil immersion objective unit and which has an illumination light path outside the observation light path which guides an illumination light such that the light is not blocked by lenses or lens-holding frames.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An objective unit comprising:
   a plurality of lenses for guiding observation light reflected from a sample;
   an inner frame surrounding and holding said plurality of lenses;
   an outer frame surrounding said inner frame;
   an annular path provided between said inner frame and said outer frame along which illumination light passes; and
   a deflecting member for deflecting the illumination light passing along said annular path to thereby guide the illumination light to the sample;
   wherein said plurality of lenses includes a shared lens for allowing passage of the observation light and the illumination light, and
   wherein said inner frame includes at least one through hole for guiding the illumination light deflected by said deflecting member to the sample through said shared lens, and at least one transparent member inserted in said at least one through hole.

2. The objective unit according to claim 1, wherein said at least one transparent member has a greater refractive index than said shared lens.

3. The objective unit according to claim 1, wherein said inner frame includes a plurality of through holes for guiding the illumination light, and a plurality of transparent members provided in a same number as the plurality of through holes, said plurality of transparent members being inserted in respective ones of said plurality of through holes.

4. The objective unit according to claim 1, wherein said shared lens and said at least one transparent member are coupled by an adhesive which is transparent to light.

5. The objective unit according to claim 1, wherein said shared lens and said at least one transparent member are optically coupled.

6. An objective unit comprising:
   a plurality of lenses for guiding observation light reflected from a sample;
   an inner frame surrounding and holding said plurality of lenses;
   an outer frame surrounding said inner frame;
   an annular path provided between said inner frame and said outer frame along which illumination light passes; and
   a deflecting member for deflecting the illumination light passing along said annular path to thereby guide the illumination light to the sample;
   wherein said plurality of lenses includes a shared lens for allowing passage of the observation light and the illumination light, and
   wherein said inner frame includes at least one transparent portion for guiding the illumination light deflected by said deflecting member to the sample through said shared lens.

7. The objective unit according to claim 6, wherein said at least one transparent portion of said inner frame has a greater refractive index than said shared lens.

8. The objective unit according to claim 6, wherein said shared lens and said at least one transparent portion of said inner frame are coupled by an adhesive which is transparent to light.

9. The objective unit according to claim 6, wherein said shared lens and said at least one transparent portion of said inner frame are optically coupled.

10. The objective unit according to claim 6, wherein said inner frame includes an additional through hole for guiding reflected beams of the illumination light reflected from the sample to return the reflected beams to said annular path.

11. An objective unit comprising:
    a plurality of lenses for guiding observation light reflected from a sample;
    an inner frame surrounding and holding said plurality of lenses;
    an outer frame surrounding said inner frame;
    an annular path provided between said inner frame and said outer frame along which illumination light passes; and
    a deflecting member for deflecting the illumination light passing along said annular path to thereby guide the illumination light to the sample;
    wherein said plurality of lenses includes a shared lens for allowing passage of the observation light and the illumination light, and
    wherein said inner frame includes a through hole for guiding the illumination light deflected by said deflecting member to the sample through said shared lens.

12. The objective unit according to claim 11, wherein said inner frame includes an additional through hole for guiding reflected beams of the illumination light reflected from the sample to return the reflected beams to said annular path.

* * * * *